UNITED STATES PATENT OFFICE.

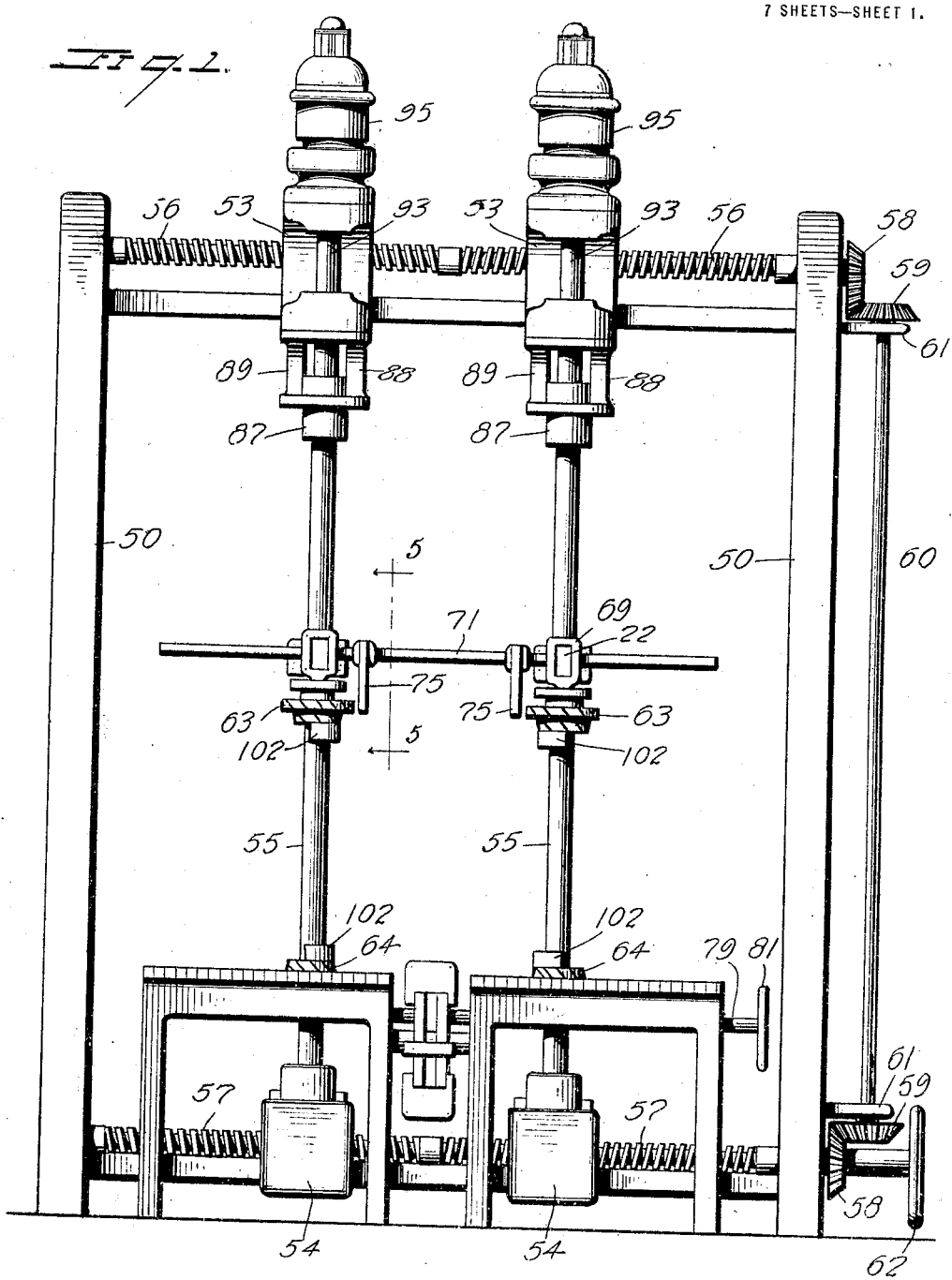

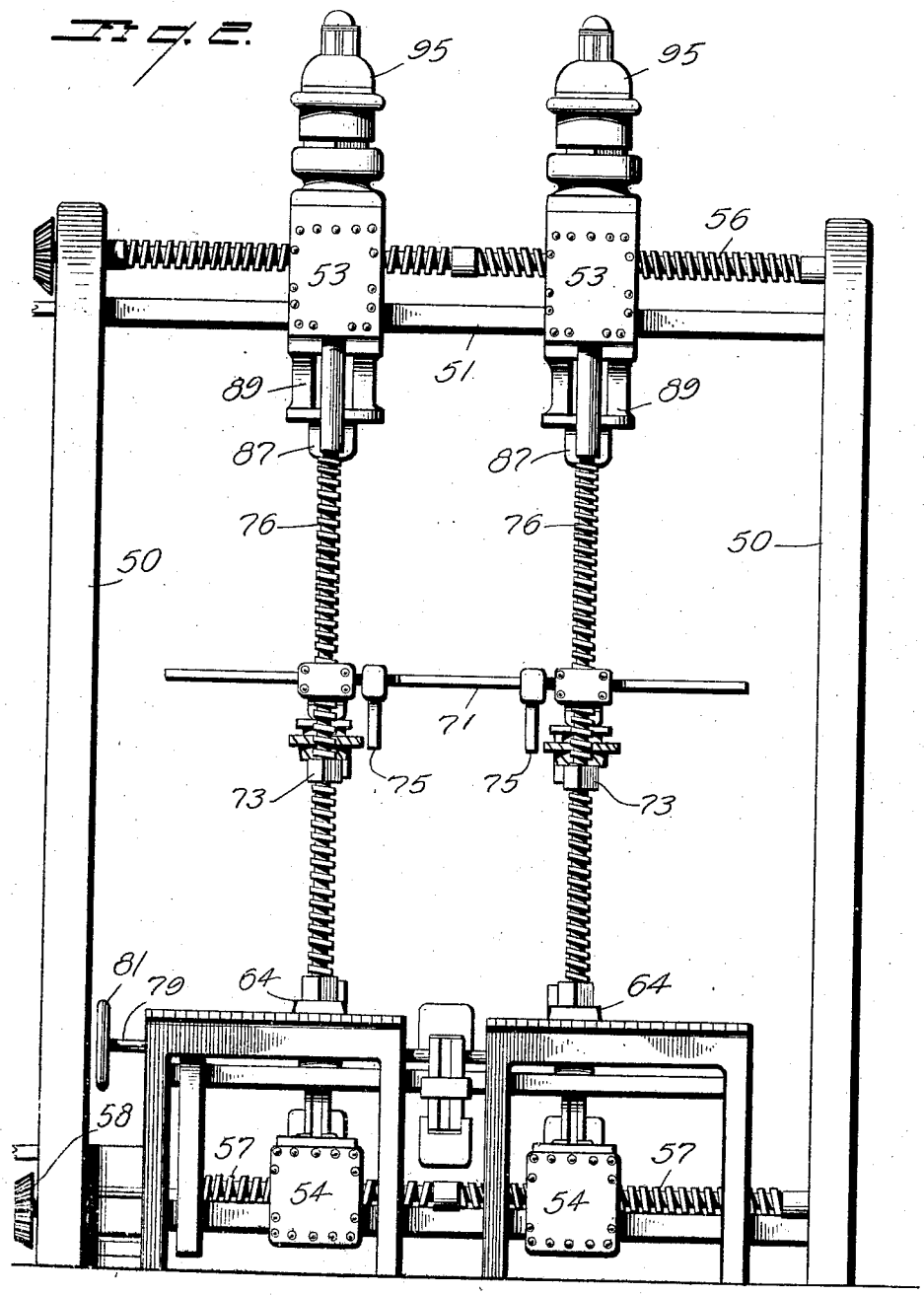

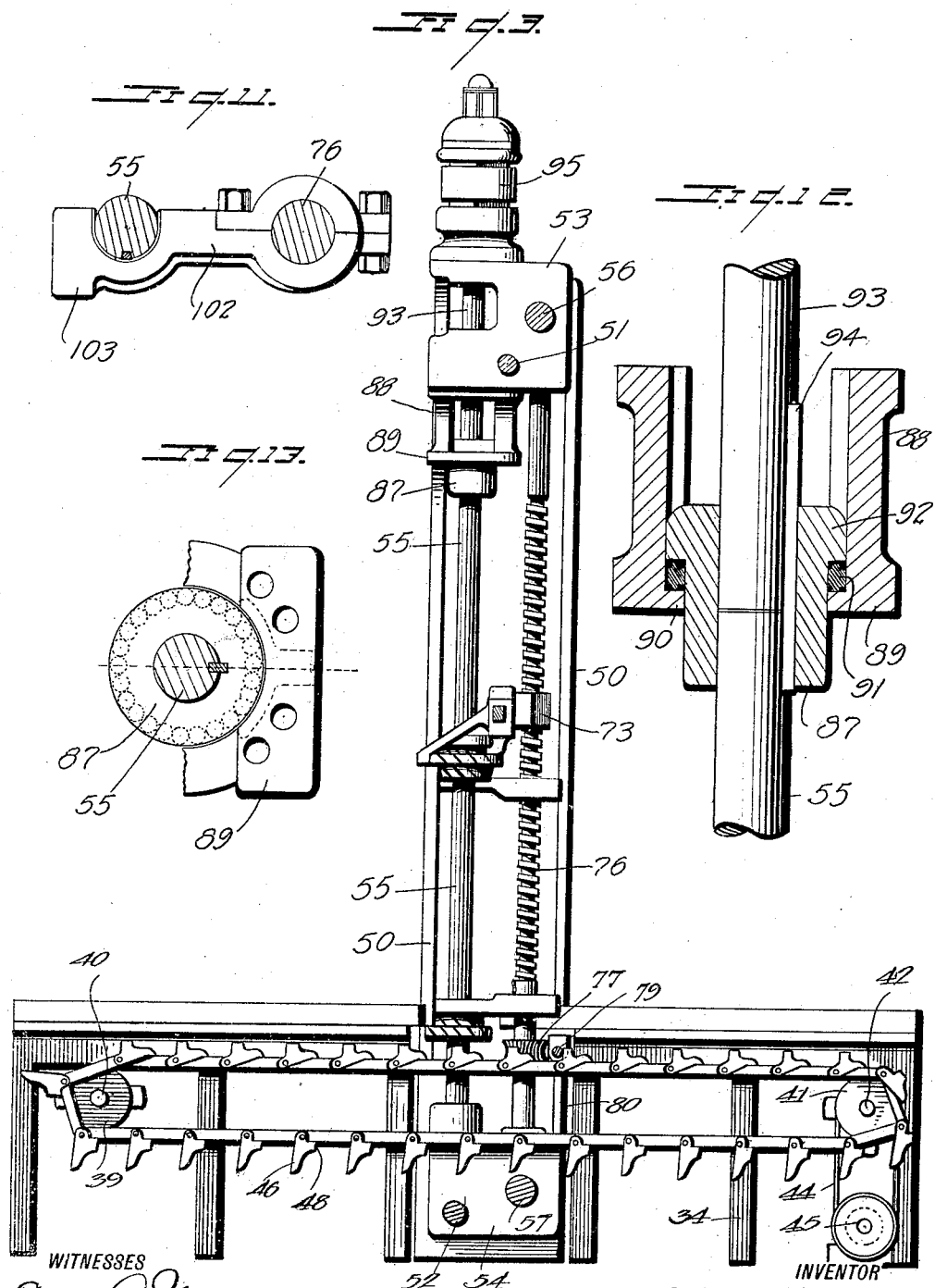

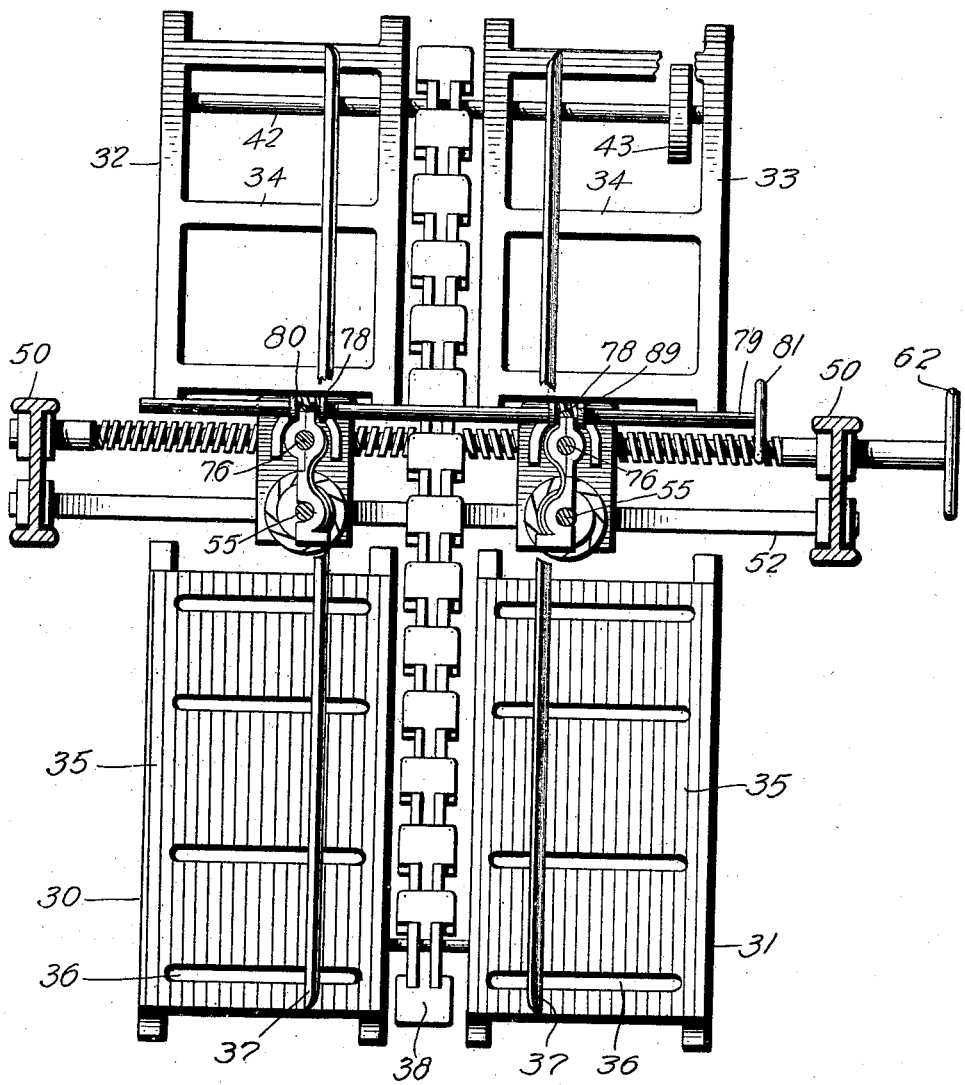

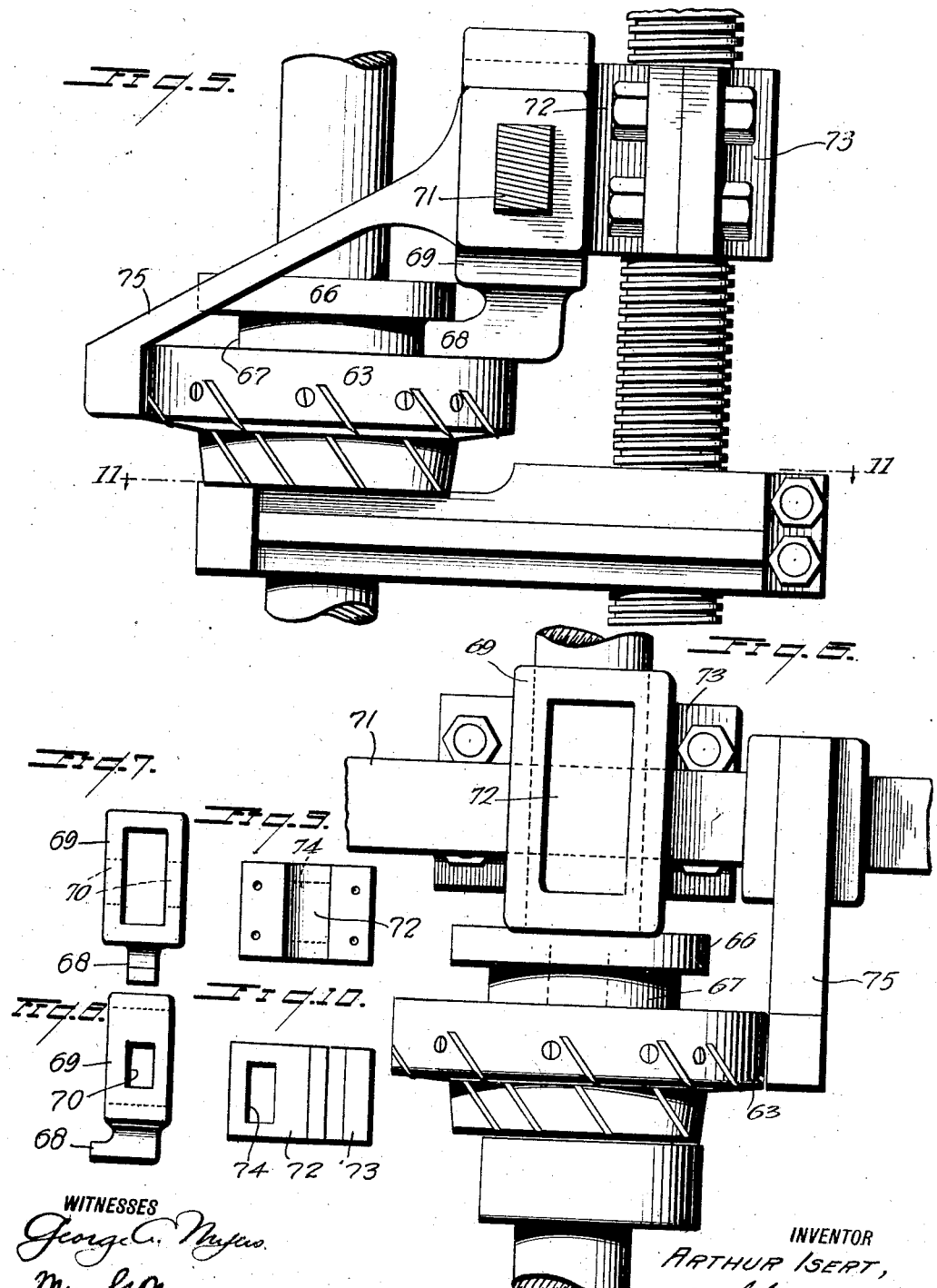

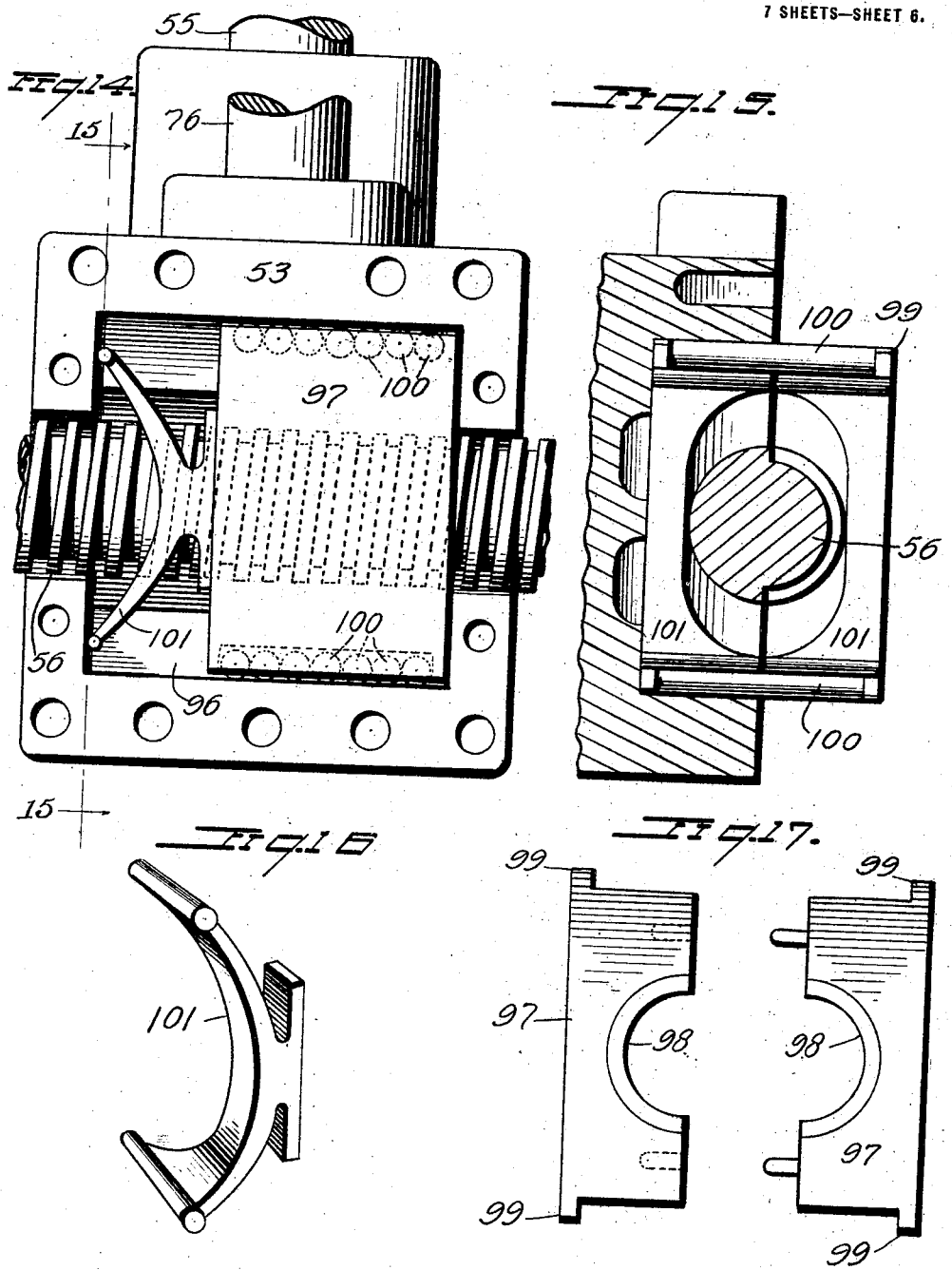

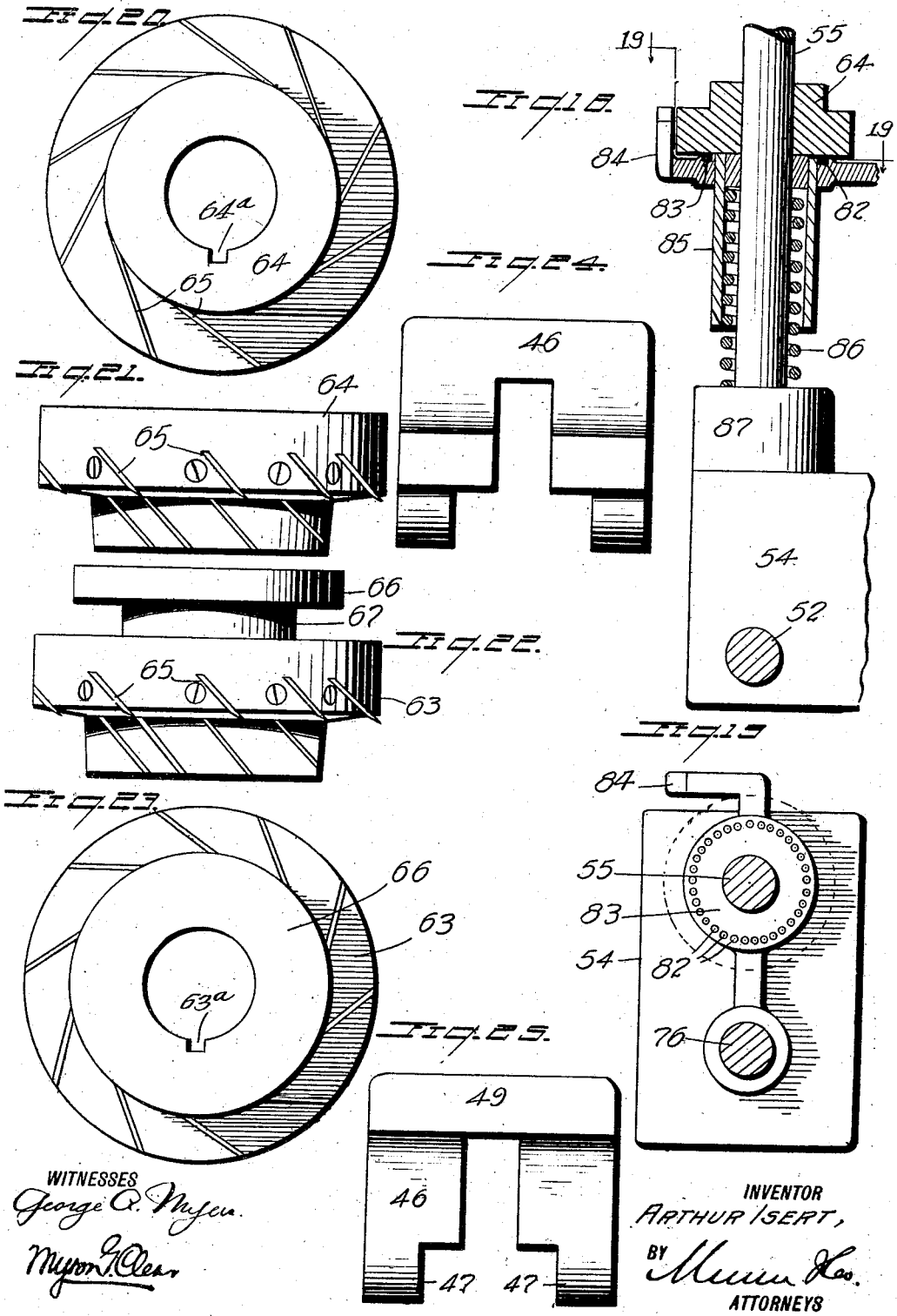

ARTHUR ISERT, OF SAN FRANCISCO, CALIFORNIA, ASSIGNOR TO PACIFIC BOX FACTORY, OF SAN FRANCISCO, CALIFORNIA, A CORPORATION OF CALIFORNIA.

BOX-TRIMMING MACHINE.

1,265,337.  Specification of Letters Patent.  Patented May 7, 1918.

Application filed July 24, 1917. Serial No. 182,423.

*To all whom it may concern:*

Be it known that I, ARTHUR ISERT, a citizen of the United States, and a resident of San Francisco, in the county of San Francisco and State of California, have made certain new and useful Improvements in Box-Trimming Machines, of which the following is a specification.

My present invention relates particularly to box trimming machines by which the projecting ends of the corner locks of boxes of this type are trimmed even with the outer surfaces of the boxes and preferably at slight bevels, the primary object of my invention being the provision of a machine of this type which will be comparatively simple and inexpensive and which will obviate the necessity of skilled attendants.

A further object is to provide a machine capable of a wide range of adjustment and one in which the cutters when adjusted are yieldable in connection with guide means so as to provide for operation in connection with boxes either slightly varying in size or having imperfectly planed faces.

A still further object is to provide a machine of the above type having novel and effective adjusting means permitting of ready and easy adjustment from a single point so as to render adjusting movements of the several parts uniform and accurate.

A still further object is to provide a machine of this type having its cutters mounted and adjustable upon cutter arbors, the latter of which are so mounted as to permit of ready detachment from the machine to release the cutters for purposes of repair and substitution.

Other objects of my invention, as well as its construction, operation and advantages will clearly appear in the course of the following specification in which reference is made to the accompanying drawing forming part of this specification and wherein, Figure 1 is a front elevation of the complete machine.

Fig. 2 is a rear elevation thereof.

Fig. 3 is a vertical longitudinal section therethrough.

Fig. 4 is a horizontal section.

Fig. 5 is an enlarged detail taken substantially on line 5—5 of Fig. 1.

Fig. 6 is a front elevation of the parts shown in Fig. 5.

Figs. 7 and 8 are respectively a front and side elevation of one of the upper cutter head lifters, removed.

Figs. 9 and 10 are respectively similar views of one of the lifter lugs removed.

Fig. 11 is a detail horizontal section taken on line 11—11 of Fig. 5.

Fig. 12 is a detail vertical section through one of the slip couplers.

Fig. 13 is a sectional plan view of a portion of Fig. 12.

Fig. 14 is a rear enlarged elevation of one of the arbor heads with its face plate removed.

Fig. 15 is a partial vertical section taken substantially on line 15—15 of Fig. 14.

Fig. 16 is a perspective view of one of the springs seen in Figs. 14 and 15.

Fig. 17 is a side view of the screw bearing of Figs. 14 and 15 with its parts in spaced relation.

Fig. 18 is a sectional view through the spring support of one of the lower cutter heads.

Fig. 19 is a horizontal section taken substantially on line 19—19 of Fig. 18.

Figs. 20 and 21 are respectively a plan and side view of one of the lower cutter heads, the latter figure being inverted.

Figs. 22 and 23 are respectively a plan and side view of one of the upper cutter heads, and Figs. 24 and 25 are respectively a front and rear elevation of one of the box engaging levers of the feed chain.

Referring now to these figures and particularly to the assembled views, Figs. 1 to 4 inclusive, the present machine includes a horizontal feed table comprising four sections, two front side sections 30 and 31 and two similar side sections 32 and 33, each section preferably having a cast skeleton frame 34 and a wooden top 35, the latter provided with transverse slots 36 in which its respective section 37 of the guide rails is adjustable and secured by any well known means.

It will be noted that the front and rear sections are set apart to form a central laterally extending space in which the cutting or trimming mechanism, to be presently described, is positioned, and that the side sections both in front and rear are likewise set apart to provide a longitudinal space intersecting the lateral space and in which is located the box feed chain 38, all as best seen in the plan view, Fig. 4. The chain 38 travels at its forward end around a forward sprocket 39 on a short forward shaft 40, carried by the inner portions of the table sections 30 and 31, while its rear end travels around a sprocket 41 on a rear shaft 42 extending the full width of the two rear table sections 32 and 33 and having a pulley 43 connected by a depending belt 44 to the shaft of a lower rear induction feed motor 45 all as best seen by reference to Figs. 3 and 4.

The chain 38 is of the link type and connected in spaced relation therealong are box engaging levers 46 of the particular type shown in detail in Figs. 24 and 25, having depending side extensions 47 by which they are pivoted to the chain, said extensions straddling the links. These levers 46 also have rear extensions 48 which rest on the chain links as the lever rises to vertical position in rounding the forward sprocket 39 as seen at the left in Fig. 3 so as to brace the levers as they engage a box providing a box is then at the feed station. If so, the box is engaged by the forward engaging face 49 of the respective lever and is carried rearwardly on the table sections, above which the upper ends of the levers project in their vertical positions as shown in Fig. 2, between the guide rails 37 and through the longitudinal space and consequently through the trimming mechanism, the trimmed boxes being finally discharged at the rear end of the feed chain between the rear ends of the rear table sections 32 and 33. If no box is at the feed station as a lever 46 rises to vertical position, the lever is free to fall rearwardly to horizontal position on the chain as shown at the upper run of the chain in Fig. 3.

Mounted beyond the outer sides of the table sections and alined transversely with the lateral space between the forward and rear table sections, are a pair of supporting uprights 50 extending some distance above the level of the feed table and connected adjacent their upper and lower ends by horizontal supporting rods 51 and 52, thus forming a rigid rectangular frame for the trimming mechanism. Journaled to slide on these rods 51 and 52 respectively are pairs of upper and lower arbor heads 53 and 54 between which extend vertical cutter arbors 55. The arbor heads of each pair, and consequently the arbors 55 are laterally spaced at equal distances at opposite sides of the longitudinal median line of the machine and are simultaneously adjusted toward and away from one another by means of upper and lower right and left threaded screw shafts 56 and 57 extending through the arbor heads 53 and 54 as seen in Fig. 3. As seen in Figs. 1 and 2 in particular, these screw shafts 56 and 57 are journaled at their ends in the uprights 50 and are provided at one end with bevel gears 58 meshing with bevel gears 59 at the upper and lower ends of an upright connecting shaft 60 journaled in brackets 61 along the outer side of one of the uprights 50, the lower screw shaft 57 having at one end a hand wheel 62 upon rotation of which movement is uniformly imparted to the screw shafts 56 and 57 so as to simultaneously shift the arbor heads.

Splined upon the arbors are upper and lower cutter heads 63 and 64, for which purpose the cutter heads have inner grooves 63$^a$ and 64$^a$, as seen in Figs. 20 and 23. The cutter heads 64 are arranged at the level of the feed table and the cutter heads 63 are arranged some distance thereabove and are shiftable vertically to adjust the same toward and away from the lower cutter heads as presently described, each of the several cutter heads, as best seen in Figs. 20 to 23 inclusive, having a cylindrical portion and an annularly enlarged portion forming angularly disposed faces in which the cutters 65 are secured in positions at geometrical tangents whereby in their rotation to produce a shaving from the corners of the boxes and obviate striking the box locks at right angles and all danger of breaking or splitting the same. In addition, the upper cutter heads 63 have upper extensions 66 provided with annular grooves 67 in which are engaged the lower angular projections 68 of a pair of lifting members 69 provided with rectangular bodies having side wall openings 70 receiving the opposite end portions of a connecting lifted rod 71 best seen in the details Figs. 5 to 8 inclusive.

The lifting members 69 are hollow to receive, and are adjustable vertically with respect to, lifting brackets 72 having rear threaded bearings 73 and lateral enlarged openings 74, said openings 74 alining with the openings 70 of the lifting members. Through these openings 70 and 74 the rod 71 extends and this rod is movable vertically with the lifting members whose openings 70 it fits so that the latter and the upper cutter heads 63 may yield vertically with respect to the lifter brackets 72 to a limited extent, and under control of vertically movable controlling arms 75 secured to the rod 71 and depending forwardly and downwardly to the forward inner sides of the cutter heads 63 so as to engage the upper surfaces of a box as it passes beneath the cutters. In this way slightly over-size boxes may be accommodated and irregularities upon the upper surfaces discounted.

The rear threaded bearings 73 of the lifter lugs 72 are disposed around vertical screw shafts 76 as seen in Fig. 5, which shafts, as seen in Fig. 3, are journaled at their upper and lower smooth ends in the upper and lower arbor heads 53 and 54 and are provided below the feed table with worm wheels 77 one of which is seen in Fig. 3 engaged by worms 78 secured upon a transverse adjusting shaft 79. This adjusting shaft 79, as seen in Figs. 3 and 4, is journaled in brackets 80 upstanding from the lower arbor heads 54, and is provided at one end with a hand wheel 81 whereby upon rotation by the operator, the upper cutter heads 63 may be raised or lowered.

As seen in the details Figs. 18 and 19, the lower cutter heads 64, which are not adjustable vertically by the operator, are, however, yieldable vertically, and to this end are supported upon bearings 82 intermediate the ends of adjusting or controlling arms 83, the forward angular ends 84 of which are upturned forwardly of the lower cutter heads to engage the bases of the boxes, and the rear ends of which are slidable vertically on the lower smooth portions of the vertical screw shafts 76. These arms 83 are connected to the upper ends of sleeves 85 depending around the lower portions of the arbors 55 in spaced relation and partially inclosing springs 86 coiled about the arbors between the upper ends of the sleeves 85 and the bosses 87 of the lower arbor heads 54 in which the lower ends of the arbors 55 are stepped. In this way the lower cutter heads may yield vertically guided by their controlling arms the same as the upper cutter heads and for the same purpose as previously described.

The lower ends of the arbors 55 are freely removable from the lower arbor heads 54 and their upper ends extend upwardly into slip couplings 88 the details of which may be best understood by reference to the details, Figs. 12 and 13. These slip couplings are tubular in form and are shiftable vertically in cages or brackets 89, which are securely bolted or otherwise fastened at their upper ends to the lower surfaces of the upper arbor heads 53 as seen in Fig. 3 and have lower inner annular flanges 90 supporting bearings 91 upon which the upper annular flanges 92 of said couplings normally rest. These slip couplings also receive the lower ends of tail shafts 93 in connection with which and the arbors 55, the coupling 87 has a splined connection by means of keys 94, so that, while normally transmitting rotative movement from the tail shafts to the arbors, the couplings 87 may be readily elevated in their cages or brackets 89 and the upper ends of the arbors 55 which terminate slightly below the cages or brackets may be released to permit of ready withdrawal of the arbors with their cutter heads 63 and 64 for purposes of repair or substitution.

The tail shafts 93 are journaled vertically through the upper arbor heads 53 and are connected by flexible couplings of any well known character, the details of which are not shown, to the shafts of vertical induction motors 95 on the upper arbor heads 53 which normally drive the arbors and their cutter heads through the connections just previously described.

In addition to their vertical yielding movements independent of the vertical adjustment of the upper cutter heads the cutters are yieldable with their arbors and arbor heads in respect to the horizontal screw shafts 56 and 57, in lateral directions to accommodate over-size boxes and those having irregularities at their sides. To this end the arbor heads, one of which is shown in detail in Figs. 14 and 15, are each provided with an inclosed chamber 96 in which is a laterally slidable shaft boxing 97 in two parts as seen in Fig. 17 with inner concave threaded portions 98 which when together snugly engage the threads of the respective horizontal screw shaft. Each boxing 97 has forward and rear upper and lower flanges 99 forming spaces between them for the reception of bearing rollers 100 engaging the upper and lower walls of the chamber 96. Normally the boxing 97 of each arbor 96 is maintained at the outer side of its chamber 96 by means of semi-elliptical spring members 101 between the inner end of the boxing and the inner end of the chamber and of sufficient strength to normally hold the boxing and its arbor head as one piece in the manual adjustment of the arbors toward and away from one another by rotation of the horizontal screw shafts.

In order to bring about the lateral yielding of the arbors with the cutter heads as above provided for, controlling arms 102 are mounted adjacent the several cutter heads, having their rear ends supported by the vertical screw shafts 76 on which the arms of the upper cutter heads have threaded engagement whereby to follow the movements of these heads in their vertical adjustment by the vertical screw shafts. The arms 102, so supported, extend forwardly of, and engage the arbors 55 at the inner sides of the latter, but do not surround the same or otherwise interfere with their removal as before provided for, the forward angular portions 103 of the arms being adapted to engage the sides of the boxes in use to accommodate over-size boxes and adjust the cutter heads to irregularities.

Thus, from the foregoing, it is apparent that in operation, the feed guide rails 37 having been set to the size of the box which is to be trimmed, the operator places a trimmed box or templet as a guide between the arbors 55 in the center of the machine and adjust the cutters to it. The machine being self-centering in the sense that both arbors are adjusted at the same time and in the same degree no particular care will have to be exercised, the operator simply turning hand wheel 62 to the left or right as the case may be, to bring the cutter heads closely against the sides of the box, and turning hand wheel 81 to bring the upper cutter heads closely against the box top. The machine is now set to the desired size of box and the operator starts operation by throwing in the switches (not shown) of the vertical induction motors 95 which, through the connections described, will rotate the cutter heads.

The operator then starts the feed by throwing in the switch of the lower horizontal induction motor 45 which, through the connections described rotates the feed chain, so that with all parts in motion the placing of the boxes between the guide rails at the feed station is then commenced, it being obvious from the previous description that boxes so placed will be carried through the machine, past the cutter heads by which the corners are trimmed, and will then be discharged. Attention is particularly called, however, to the fact that the construction shown and described permits of effective and efficient action of the cutter heads with boxes slightly over-size and irregular as well as correct sizes and smooth regular surfaces.

It is obvious that many different plans for feeding boxes to the feed chain may be adopted and that various other changes and modifications may be resorted to on account of local conditions or difficulties of installation without departing from the spirit of the invention, the scope of which is outlined in the following claims.

I claim:—

1. In a machine of the character described, a trimming mechanism including upper and lower cutter heads, vertical arbors on which said heads are mounted, upper and lower arbor heads supporting the upper and lower ends or said arbors, right and left horizontal screw shafts with which the said arbor heads have connection, and means for rotating said screw shafts to adjust the arbors toward and away from one another, each of said arbor heads having a relatively movable spring controlled boxing threaded on the said screw shafts to permit the arbor heads to yield on said shafts.

2. In a machine of the character described, a trimming mechanism including upper and lower cutter heads, vertical arbors on which said cutter heads are mounted, upper and lower arbor heads supporting said arbors, horizontal screw shafts operably connected to said arbor heads for adjusting the same and upon which the said heads are independently movable to a limited extent, and box engaging arms mounted adjacent the cutter heads and engaging the arbors to shift the latter and the cutter and arbor heads with respect to one another.

3. In a machine of the character described, a trimming mechanism including upper and lower cutter heads, vertical arbors on which said cutter heads are mounted, upper and lower arbor heads supporting said arbors, horizontal screw shafts operably connected to said arbor heads for adjusting the same and upon which the said heads are independently movable to a limited extent, and means adjacent the cutter heads for engagement with the work to shift the arbors, cutter heads and arbor heads with respect to one another on the screw shafts.

4. In a machine of the character described, a trimming mechanism including upper and lower cutter heads, vertical arbors on which said heads are mounted, upper and lower arbor heads supporting the upper and lower ends of said arbors, right and left horizontal screw shafts with which the said arbor heads have connection, and means for rotating said screw shafts to adjust the arbors toward and away from one another, each of said arbor heads having an inner chamber through which one of the screw shafts extends, a threaded boxing engaging the screw shaft and having limited movement in said chamber, and a spring extending between said boxing and one end of the chamber, for the purpose described.

5. In a machine of the character described, a trimming mechanism comprising upper and lower pairs of cutter heads, vertical arbors on which said cutter heads are mounted, supporting and driving means for said arbors, vertical screw shafts upstanding adjacent to said arbors, manual means for rotating said screw shafts, the upper cutter heads having annularly grooved extensions, lifting members having lower angular portions disposed in said annular grooves and having rectangular bodies provided with side openings, lifting lugs having threaded portions engaging the screw shafts and provided with extensions movable in the bodies of the lifting members, having enlarged openings, and a lifting rod connecting the lifting members of the upper cutter heads and extending through the openings thereof and the openings of the lifting lugs.

ARTHUR ISERT.